(12) United States Patent
Lynch et al.

(10) Patent No.: US 11,757,821 B1
(45) Date of Patent: Sep. 12, 2023

(54) MULTI-USER VOICE COMMUNICATIONS AND RELATED SYSTEMS AND METHODS

(71) Applicant: SYMPHONY COMMUNICATION SERVICES HOLDINGS LLC, Palo Alto, CA (US)

(72) Inventors: Michael Lynch, New York, NY (US); James Miller, Austin, TX (US); Alexander Francisci, New York, NY (US); Inderpal Chaggar, London (GB); Armaan Nathani, New York, NY (US)

(73) Assignee: SYMPHONY COMMUNICATION SERVICES HOLDINGS LLC, Palo Alto, CA (US)

( * ) Notice: Subject to any disclaimer, the term of this patent is extended or adjusted under 35 U.S.C. 154(b) by 0 days.

(21) Appl. No.: 18/047,852

(22) Filed: Oct. 19, 2022

(51) Int. Cl.
*G06F 3/0484* (2022.01)
*H04L 51/42* (2022.01)

(52) U.S. Cl.
CPC ............ *H04L 51/42* (2022.05); *G06F 3/0484* (2013.01)

(58) Field of Classification Search
CPC .............................. H04L 51/42; G06F 3/0484
See application file for complete search history.

(56) References Cited

U.S. PATENT DOCUMENTS

| | | | |
|---|---|---|---|
| 6,175,619 B1* | 1/2001 | DeSimone | H04M 3/42008 379/900 |
| 8,849,915 B2* | 9/2014 | Berstis | G06Q 10/10 709/205 |
| 10,153,991 B2 | 12/2018 | Pappas | |
| 10,237,246 B1 | 3/2019 | Mulayin et al. | |
| 10,432,589 B1 | 10/2019 | M'Raihi et al. | |
| 10,440,155 B2 | 10/2019 | Kammerer et al. | |
| 10,496,631 B2 | 12/2019 | Tschudin et al. | |
| 10,819,709 B1 | 10/2020 | M'Raihi et al. | |
| 10,970,029 B2 | 4/2021 | Lindblom | |
| 2003/0074451 A1* | 4/2003 | Parker | H04L 61/10 709/227 |
| 2020/0021777 A1* | 1/2020 | Borukhoff | H04W 4/16 |
| 2021/0374391 A1* | 12/2021 | Jorasch | G06V 40/10 |
| 2022/0180893 A1* | 6/2022 | Lihan | H04L 51/04 |

\* cited by examiner

*Primary Examiner* — Nhat Huy T Nguyen
(74) *Attorney, Agent, or Firm* — Goodwin Procter LLP

(57) ABSTRACT

Systems and methods are described for providing instant voice communications to users of a chat platform. An example method includes: providing a chat platform for a plurality of users, the chat platform including a plurality of chatrooms; presenting, on a client device of a first user from the plurality of users, a graphical user interface corresponding to a first chatroom from the plurality of chatrooms, the graphical user interface including a selectable element for initiating an instant voice communication channel among members of the chatroom, the members including the first user and at least one other user from the plurality of users; receiving, on the client device of the first user, an indication that the user has selected the selectable element in the graphical user interface; and providing, in response to the selection, the instant voice communication channel to client devices associated with the members.

20 Claims, 6 Drawing Sheets

MULTI-USER VOICE COMMUNICATIONS AND RELATED SYSTEMS AND METHODS

TECHNICAL FIELD

The following disclosure relates to systems and methods for data communications and, in certain examples, to systems and methods for providing instant, secure, multi-user voice communications to users of a chat application.

BACKGROUND

It is common for individuals to make voice calls using landline or wireless phone systems, and it is becoming more common for individuals to make such calls over the Internet (e.g., using voice over Internet protocol (VoIP) software). In general, however, no such call can be implemented until one of the individuals (referred to as a receiving user) answers the call, for example, by pressing an answer button on a user device.

A number of social network chat applications on the market, such as WHATSAPP, LINE, and WECHAT, include a variety of features that enable users to communicate with one another, e.g., in a voice call, video call, group chat, etc. Such chat applications can allow a user to send a text message or leave a voice message for another user; however, the voice communication capabilities of the chat applications are limited. For example, two users may not be able to conduct a live, back-and-forth voice conversation unless one user initiates a voice call and the other user answers the call.

Existing chat applications that support voice communication functions have other shortcomings. For example, voice communications or VoIP calls are often insecure (e.g., not encrypted and/or interceptable). Insecure communication channels may be acceptable for non-sensitive communications, but such channels are generally unacceptable for communications that include sensitive or confidential information.

There is a need for improved systems and methods for providing instant, secure, multi-user voice communications.

SUMMARY

In general, the systems and methods described herein can provide instant, secure voice communications to users of a chat platform. The chat platform can include computer infrastructure and software that enable users to communicate, interact, and/or exchange text and voice communications with one another over the Internet, in real time. For example, a user of the chat platform can be associated with one or more chatrooms where the user can exchange text messages with other chatroom members. A graphical user interface for the chat platform can include an element (e.g., a button) that allows a member of a chatroom to initiate an instant, secure voice communication with other members of the chatroom. For example, a first user can select the element in the graphical user interface, and the voice communication can be implemented instantly for the chatroom members. Once the first user selects the element, for example, the first user can speak into a microphone associated with the first user's client device, and the first user's voice can appear without delay at the other users' client devices. In various examples, there is no need for the other users to answer or accept the communication session before the other users can hear the first user's voice. Once initiated, the other users can respond by speaking into microphones associated with the other users' client devices, and real-time communication can take place among the members of the chatroom. The voice communication can be secured through end-to-end encryption, as described herein.

Additionally or alternatively, the systems and methods described herein provide one or more graphical user interfaces (GUIs) to efficiently and effectively achieve the functionalities described herein. The systems and methods described herein provide at least a technical solution that allows a user to navigate quickly and efficiently to access data and activate a function on electronic devices (e.g., desktop computers or mobile devices), and provide improved GUIs associated with implementing voice communications on such devices. The technical effects can include, at least: (1) improving the efficiency of using an electronic device by allowing a user to directly access and control a voice communication from a single application (e.g., a chat application); (2) improving the user's navigation speed; and (3) increasing relevancy and flexibility of the data displayed on the electronic device.

In some examples, the technical solution described herein includes a selection element for voice communications that is embedded into and displayed on one or more GUIs within a chat application (e.g., a text communication application for a chat platform). The GUIs can allow a user to view a list of chatrooms (e.g., including other users or user groups) and invoke a voice conversation with other members of a chatroom, without having to open any other applications (e.g., a separate voice application). A speed at which a user can invoke a voice communication can be improved because the user can initiate the call from the chat application and does not need to navigate to a new application to initiate the call. Rather than parsing through multiple screens or options, a single click from the user, from within the chat application, may initiate the call with other chatroom members. Moreover, the technical solution and GUIs can provide a dynamic listing of chatrooms associated with the user and can make the most relevant chatrooms or associated data available to the user, including GUI controls associated with starting and ending voice communications. These features increase the relevancy and flexibility of data displayed to the user and improve the efficiency at which the user can operate the GUIs and the associated client device. These technical effects, therefore, demonstrate an improvement in the functioning of computers.

Additionally or alternatively, the technical solution further improves computer functionality by eliminating the need for a user to interface with a computer when a voice call is received. For example, the technical solution can auto-answer an incoming voice call with little or no action required by the user. This permits hands-free operation of the computer when a call is answered and can free the user and the computer to perform other tasks in such instances.

In one aspect, the subject matter of this disclosure relates to a computer-implemented method of invoking a no-ring voice communication using an embedded control in a chat application. The method includes: providing a chat platform for a plurality of users, the chat platform including a plurality of chatrooms; presenting, on a client device of a first user from the plurality of users, a graphical user interface corresponding to a first chatroom from the plurality of chatrooms, the graphical user interface including a selectable element for initiating an instant voice communication channel among members of the chatroom, the members including the first user and at least one other user from the plurality of users; receiving, on the client device of the first user, an indication that the first user has selected the selectable element in the graphical user interface; and providing, in response to the selection, the instant voice communication channel to client devices associated with the members.

In certain examples, each chatroom from the plurality of chatrooms may include an online text communication channel. The graphical user interface may include a window corresponding to the first chatroom. The selectable element may include a button. The instant voice communication channel may provide at least one of half-duplex communication or full-duplex communication. The instant voice communication channel may provide one-to-one communication and/or one-to-many communication. The instant voice communication channel may provide end-to-end encryption of voice communications. The instant voice communication channel may provide a no-ring communication.

In some instances, to provide the instant voice communication channel, the method may also include ringing a second client device associated with one of the members and enabling one of the members to silence the ringing. The method may further include recording communications occurring over the instant voice communication channel.

In another aspect, the subject matter of this disclosure relates to a system having one or more computer systems programmed to perform operations including: providing a chat platform for a plurality of users, the chat platform including a plurality of chatrooms; presenting, on a client device of a first user from the plurality of users, a graphical user interface corresponding to a first chatroom from the plurality of chatrooms, the graphical user interface including a selectable element for initiating an instant voice communication channel among members of the chatroom, the members including the first user and at least one other user from the plurality of users; receiving, on the client device of the first user, an indication that the first user has selected the selectable element in the graphical user interface; and providing, in response to the selection, the instant voice communication channel to client devices associated with the members.

In some examples, each chatroom from the plurality of chatrooms may include an online text communication channel. The graphical user interface may include a window corresponding to the first chatroom. The selectable element may include a button. The instant voice communication channel may provide at least one of half-duplex communication or full-duplex communication. The instant voice communication channel may provide one-to-one communication and/or one-to-many communication. The instant voice communication channel may provide end-to-end encryption of voice communications. The instant voice communication channel may provide a no-ring communication.

In certain implementations, to provide the instant voice communication channel, the system may also include one or more computer systems programmed to perform operations of ringing a second client device associated with one of the members and enabling the one of the members to silence the ringing. The system may further include one or more computer systems programmed to perform the operation of recording communications occurring over the instant voice communication channel.

In another aspect, the subject matter of this disclosure relates to a non-transitory computer-readable medium having instructions stored thereon that, when executed by one or more computer processors, cause the one or more computer processors to perform operations including: providing a chat platform for a plurality of users, the chat platform including a plurality of chatrooms; presenting, on a client device of a first user from the plurality of users, a graphical user interface corresponding to a first chatroom from the plurality of chatrooms, the graphical user interface including a selectable element for initiating an instant voice communication channel among members of the chatroom, the members including the first user and at least one other user from the plurality of users; receiving, on the client device of the first user, an indication that the first user has selected the selectable element in the graphical user interface; and providing, in response to the selection, the instant voice communication channel to client devices associated with the members.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art.

It should be understood that the order of steps or order for performing certain actions is immaterial so long as the invention remains operable. Moreover, two or more steps or actions may be conducted simultaneously.

In various examples, the systems and methods described herein allow end users to initiate instant, secure, and real-time voice communications through embedded controls within a chat application (e.g., text communication application). Use cases for the systems and methods can include a variety of scenarios where instant, secure voice communications are needed or helpful, such as, for example, communications by trading desks at financial institutions, negotiations of economic terms for financial transactions, and/or crisis management in government or business organizations.

In certain examples, an "instant" voice communication can refer to a multi-user voice communication session that can be implemented with little or no delay (e.g., within 1 second, 0.5 seconds, or 0.1 seconds) after one user initiates the communication session on the user's client device. For example, as described herein, a first user can initiate the communication session by selecting an element in a graphical user interface on the first user's client device. Immediately after selecting the element, the first user can speak into a microphone associated with the first user's client device and the first user's voice can appear at one or more other client devices with little or no delay (e.g., within 1 second, 0.5 seconds, or 0.1 seconds). The voice communication can be implemented without ringing the one or more other client devices (e.g., a "no-ring" voice communication) and/or without waiting for the communication session to be accepted on the one or more other client devices. An elapsed time between the first user initiating the communication session and the first user's voice appearing at the one or more other client devices can be less than 1 second, less than point 0.5 seconds, or less than 0.1 seconds.

In certain examples, a "secure" voice communication can refer to a voice communication between two or more client devices that is secured by end-to-end encryption and/or cannot be intercepted by a third party.

Overview

Figure 1:
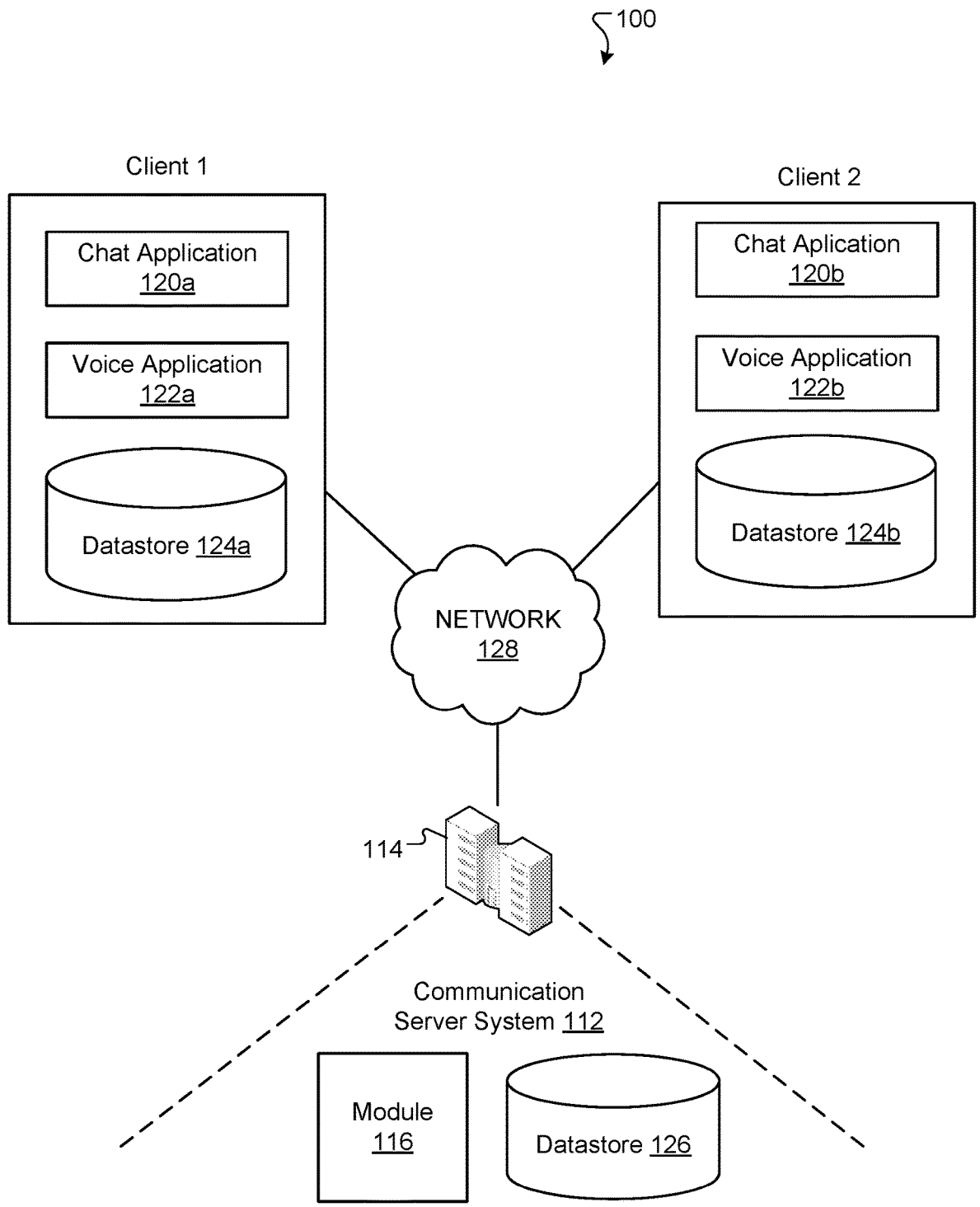
FIG. 1 is a schematic diagram of a system for providing instant voice communications for users using an embedded control in a chat application, according to an exemplary embodiment.

FIG. 1 illustrates an example system 100 that allows two or more users to participate in instant, secure voice communications with one another in real time using embedded controls in a GUI for a text communication application (a chat application). The voice communication between the users may be an instant, no-ring voice communication. In some instances, the system or chat platform 100 may be constructed using a client-server structure, where server applications running on one or more servers can communicate with client applications running on one or more client devices, which can be geographically distributed (e.g., in different countries or continents) or in remote locations. As depicted in the example of FIG. 1, system 100 includes a communication server system 112 and two clients (i.e., client 1 and client 2) communicatively coupled to the communication server 112 via a network 128 (e.g., including the Internet). While the depicted example shows only one server and two clients, it is understood that any number of additional clients and servers can be included in or utilize the system 100.

The communication server system 112 provides functionality for hosting and securing data and voice communications among users of the clients. In the depicted example, the communication server system 112 includes software components and databases that can be deployed at one or more data centers 114 in one or more geographic locations.

The server system 112 software components may include a module 116 (e.g., a server application) for providing communication operations such as receiving a message (e.g., text, voice, and/or video), encrypting and/or decrypting the message, identifying correct recipient(s), queuing and forwarding the message to the client application(s) of the correct recipient(s), etc. The software components may include subcomponents that may execute on the same or different individual processors or data processing apparatus. The communication server system 112 databases may include a secure datastore 126 for storing data that can be accessed and shared by client 1 and client 2. For example, the secure datastore 126 may include data related to chatrooms, chatroom members, communication types, communication statuses (e.g., active, inactive), etc. The data may be stored in the datastore 126 in encrypted form. The datastore 126 may be or include an object database, an object-relational database, and/or other types of databases. The datastore 126 may reside in one or more physical storage systems and/or may include or utilize a cloud storage infrastructure. The software components and data will be further described below.

In various examples, client 1 and client 2 may each be or include a client device (e.g., personal computer, smartphone, tablet, etc.) associated with an individual user (e.g., a first user and a second user respectively). Each user may access the respective client device, and each client device may include software components and networking equipment that facilitate various types of communications (e.g., text, audio, and/or video) among the users and the client devices. As depicted in FIG. 1, client 1 may include a chat application 120a, a voice application 122a, and a datastore 124a, and client 2 may include a chat application 120b, a voice application 122b, and a datastore 124b. The chat application, voice application, and datastore associated with each client device may be collectively and respectively referred to as chat application 120, voice application 122, and datastore 124. In alternative examples, the chat application 120 and the voice application 122 can be incorporated into a single application having the chat and voice functionality described herein.

The chat application 120 is generally a text communication application for users to exchange text messages. For example, the chat application 120 may be an application (e.g., a desktop application) that can provide an instant text messaging service for financial firms or other entities in need of secure, real-time text communications. The voice application 122 may be an application that can provide instant, secure, voice communications for such entities. By facilitating data exchanges between the chat application 120 and the voice application 122, the system 100 can add voice communication functionalities (e.g., instant, no-ring voice communications) to the text communication application (e.g., the chat application 120). For example, client 1 and client 2 can integrate the chat application 120 and the voice application 122 to connect two or more users in back-and-forth voice conversations that are secure and initiated by either user immediately upon demand. The integrated application (e.g., a combination of the chat application 120 and the voice application 122) may enhance the users' communication experience, for example, by allowing the users to initiate instant voice communications from a chat platform.

In certain implementations, a user of the integrated application may click a connection button included in a GUI for a chatroom (e.g., an online interactive discussion group) to invoke an instant voice communication with other members of the chatroom (e.g., coworkers or colleagues of the user). For text communications, the group of participants or chatroom members can exchange text messages in real time. The chatroom can be or represent a virtual place where chatroom members interact by exchanging messages that are entered into an input box and displayed in a chat window for other users to view. A user may belong to multiple chatrooms on a given chat platform and may engage in discussions with different chatroom members. In certain implementations, the system or chat platform 100 may include and display multiple chatrooms in one or more GUIs of the integrated application. Each chatroom may have or be associated with a chat window, and each chat window may include a connection button. When the connection button associated with a chatroom is selected by a user, an instant voice connection between the user and the members of that chatroom can be initiated. The process for initiating the instant voice connection for a chatroom is described in more detail below with reference to FIGS. 2-5.

In certain implementations, a "no-ring" instant voice communication may be invoked. This can occur, for example, when the receiving user sets his/her notification preference to "auto-answer." From the perspective of the initiating user, the voice communication can appear to start immediately, once the user selects a connection button for the chatroom. In scenarios where members of the chatroom require frequent and/or immediate communications (e.g., stock brokers buying or selling equities in a volatile market), this "no-ring" feature can significantly increase communication efficiency. The instant voice communication may also be secured through encryption, and the communication may be recorded and/or available for auditing. These unique features of the system 100 are described in more detail below with reference to FIGS. 3 and 4.

In various examples, the system 100 may utilize or include a secure database (e.g., the datastore 124), which can be or include, for example, an object database, an object-relational database, and/or a key-value database. The secure database can utilize a cloud storage infrastructure that allows users to store and access data and/or partitions of the data (e.g., datasets). Such data may include, for example, data specific to a client such as a client name, client location, user identifier, user preferences (e.g., for notification configuration), client device identifier, client device location, applications of the client device, and other data related to the client, client device, and/or user associated with the client device. In some examples, the data stored in the secure database can include recordings of or metadata related to text, audio, and/or video communications among system users.

Figure 2:
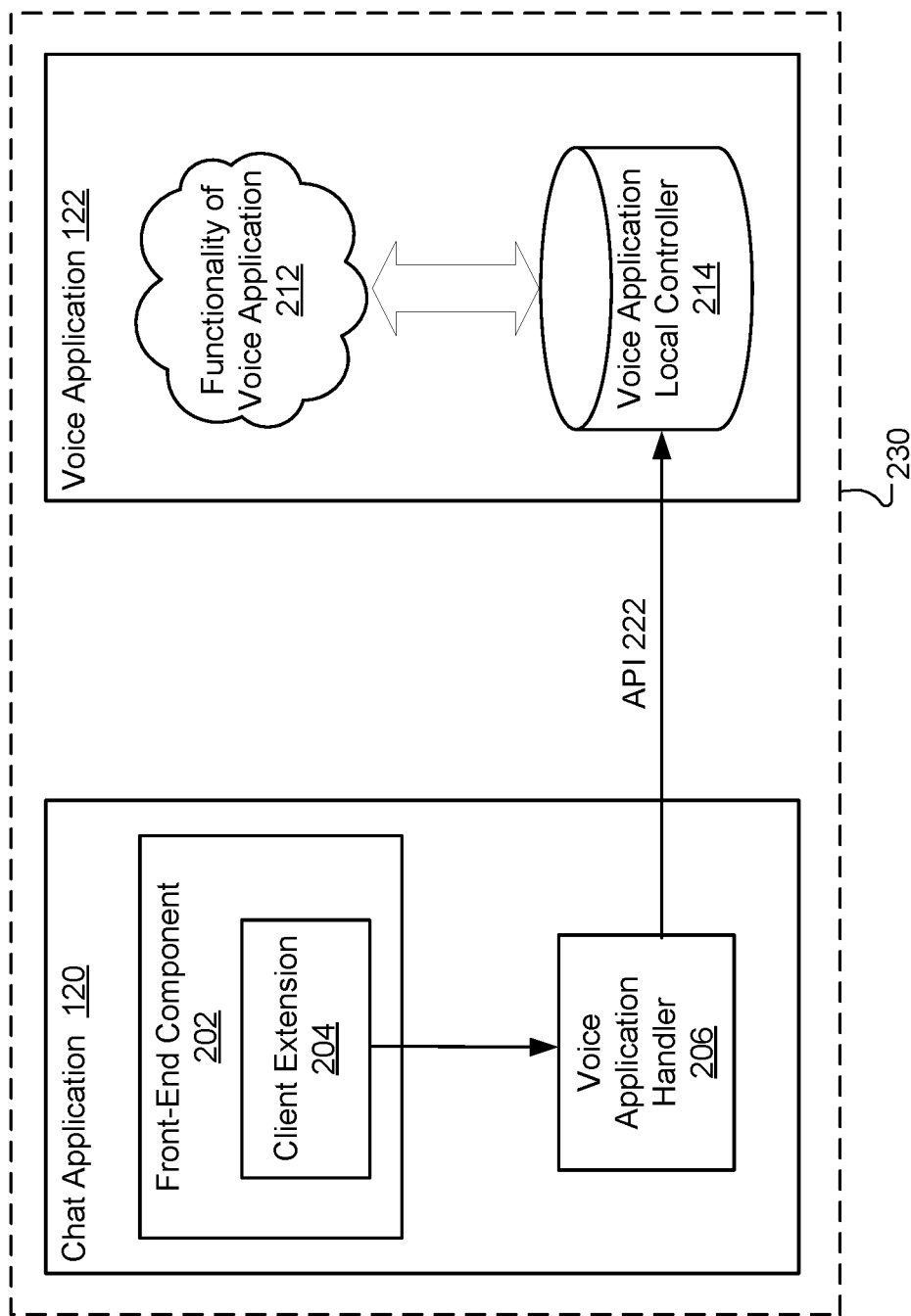
FIG. 2 is a schematic diagram of interactions among components of the system of FIG. 1, according to an exemplary embodiment.

FIG. 2 is a schematic diagram of interactions between the chat application 120 and the voice application 122, which may be integrated to enable a user to initiate a voice call (e.g., an instant, no-ring call) from within the chat application 120. In some instances, an instant voice extension application using a unique application programmable interface (API) layer may be applied to integrate the chat application 120 and the voice application 122.

In the depicted example, the chat application 120 may be or include a desktop application and/or a web browser application having a front-end component 202. The front-end component 202 is contained within a modified electron-based container to allow the chat application 120 to be installed and run on client devices (e.g., windows-based personal computers). The front-end component 202 may support the GUIs of the chat application 120. In some instances, the chat application 120 may utilize or include communication, encryption, and data storage features described in: U.S. Pat. No. 10,432,589, issued Oct. 1, 2019, titled "Secure End-to-End Communications"; U.S. Pat. No. 10,237,246, issued Mar. 19, 2019, titled "Secure Message Search"; U.S. Pat. No. 10,819,709, issued Oct. 27, 2020, titled "Authorizing Delegated Capabilities to Applications in a Secure End-to-End Communications System"; U.S. Pat. No. 10,496,631, issued Dec. 3, 2019, titled "Secure Information Retrieval and Update"; and U.S. Pat. No. 10,970,029, issued Apr. 6, 2021, titled "Dynamic User Interface and Module Facilitating Content Sharing in a Distributed Computing Environment," the entire disclosures of which are incorporated by reference and form part of this written description. In general, the chat application 120 may provide secure end-to-end instant messaging for chatrooms.

The voice application 122 as depicted in FIG. 2 may be installed and run on client devices (e.g., windows-based personal computers) and may include a GUI framework, which can be implemented using, for example, a windows presentation form (WPF) .NET application, JAVASCRIPT, or TYPESCRIPT. In some instances, the voice application 122 may utilize or include voice communication features described in: U.S. Pat. No. 10,153,991, issued Dec. 11, 2018, titled "Use-Based Scalable Instant Voice Communication"; and U.S. Pat. No. 10,440,155, issued Oct. 8, 2019, titled "Private Connection Multi-Media Transition," the entire disclosures of which are incorporated by reference and form part of this written description. The voice application can include functionality 212 that establishes a connection between two or more users and provides secure end-to-end voice communications.

In some implementations, an instant voice extension application can be used to integrate the chat application 120 and the voice application 122. The instant voice extension application may include a set of components (e.g., JAVASCRIPT-based micro components) that facilitate communication between the chat application 120 and the voice application 122. As depicted in the example of FIG. 2, the components of the instant voice extension application may include a client extension 204, a voice application handler 206, and a voice application local controller 214. While FIG. 2 depicts the components of the instant voice extension application (e.g., the client extension 204, the voice application handler 206, and the voice application local controller 214) as residing in the chat application 120 and the voice application 122, it is understood that the instant voice extension application or any of its components may be separate from and may communicate with the chat application 120 and the voice application 122. For example, the instant voice extension application could be considered a separate application that interacts with the chat application 120 and the voice application 122.

An instant voice communication may be initiated by coordinating operations performed using the chat application 120, the voice application 122, and the instant voice extension application. In some instances, an initiating user may interface and interact with the chat application 120, e.g., using one or more GUIs provided by the front-end component 202 of the chat application 120. Additionally or alternatively, the voice application 122 may run as a separate, background process and may not have its own dedicated GUI (e.g., the voice application may be hidden from the user's view). For example, using the client extension 204, the user may interact with one or more GUIs provided by the chat application 120 to make voice calls over connections established through the voice application 122. The instant voice extension application (e.g., including client extension 204, voice application handler 206, and voice application local controller 214) can facilitate inter-process communications between the chat application 120 and the voice application 122. This may allow a user of the chat application 120 to utilize the functionality 212 of the voice application 122, and consequently to place voice calls using the chat application 120. The user does not need to engage in any direct interactions with the voice application 122 or navigate to other applications to make voice calls, thereby reducing computer and network costs that may otherwise be required.

In certain examples, the voice application handler 206 of the chat application 120 may be responsible for managing operations of the voice application 122. For example, the voice application handler 206 may generate and expose an API that can be used by the front-end component 202 and its extension modules, e.g., client extension 204, for interacting with the voice application 122. The client extension 204 will be further described in FIG. 3. The voice application 122, on the other hand, may include a voice application local controller 214, which may communicate with the voice application handler 206 of the chat application 120 to establish communication channels between the chat application 120 and the voice application 122. As depicted in FIG. 2, the voice application local controller 214 may communicate with the voice application handler 206 using an API 222, which can provide an inter-process communication mechanism. In some instances, the API 222 can include or utilize a named pipe, which can serve as a one-way or duplex pipe for communication between a pipe server and one or more pipe clients. In general, any process may act as both a server and a client, making peer-to-peer communication possible. For example, a pipe server can refer to a process that creates a named pipe, and a pipe client can refer to a process that connects to an instance of a named pipe. All instances of a named pipe may share the same pipe name, but each instance may have its own buffers and handles and may provide a separate conduit for a client/server communication. The use of instances enables multiple pipe clients to use the same named pipe simultaneously.

While the example in FIG. 2 shows the chat application 120 and the voice application 122 as separate applications in communication with one another, it is understood that functionality from the chat application 120 and the voice application can be incorporated into a single, monolithic application 230. In such instances, the single application 230 can include a user interface layer that provides a GUI and interacts with the voice communication functionality described herein. For example, the fully integrated, single application 230 may incorporate components/functions of a chat application and a voice application that allows instant, secure voice communication through user interactions with GUI elements that further support chat or text communications among users or groups of users (e.g., chatrooms).

User Interaction

Figure 3:
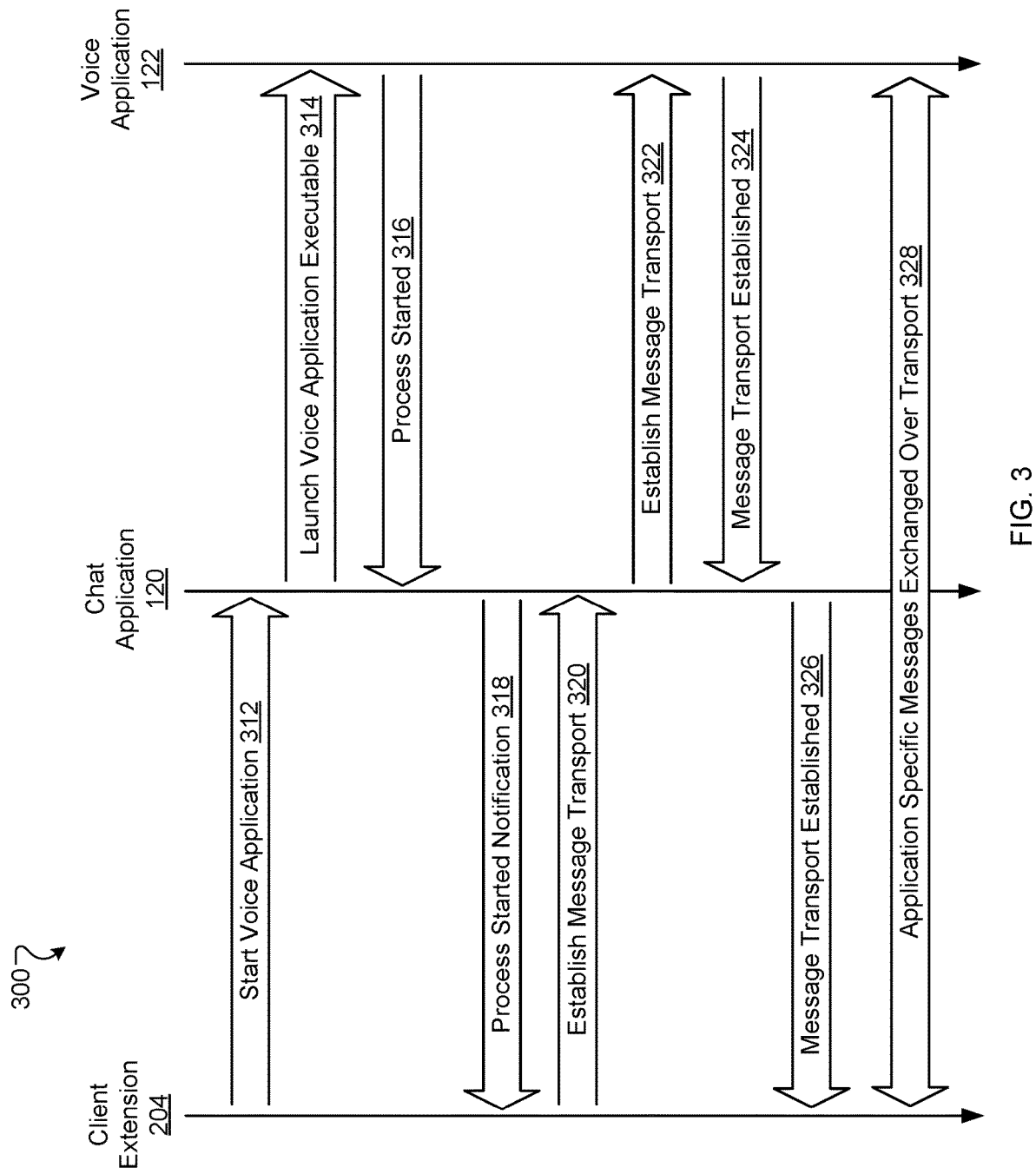
FIG. 3 is a sequence diagram of an example method of establishing an instant, secure voice communication session, according to an exemplary embodiment.

FIG. 3 is a sequence diagram of an example method 300 of establishing a secure voice communication channel based on interactions between components of an integrated application (e.g., including the client extension 204, chat application 120, and voice application 122). As mentioned above, in some examples, the client extension 204 (or other components of the instant voice extension application) may be separate from and able to communicate with the chat application 120 and/or the voice application 122. In the example of FIG. 3, the chat application 120 and the voice application 122 may establish communications with one another over a network (e.g., including a local network connection). Such communications can be established or performed using an API (e.g., API 222). Alternatively or additionally, chat functionality and voice functionality provided by the chat application 120 and the voice application 122 can be incorporated into a single integrated application (e.g., application 230), as described herein.

In some instances, both the chat application 120 and the voice application 122 are processes running in a WINDOWS environment, though other environments can be used (e.g., MAC OS or UNIX). When a user logs into a chat platform utilizing the chat application 120, the client extension 204 may be loaded and may determine if the user is authorized to use the voice application 122. Such authorization can be based on, for example, an established user account, membership in a given chatroom, or other predetermined criteria. Once the client extension 204 determines that the current user is authorized to access the voice application 122, and the client extension 204 may instruct (step 312) the chat application 120 to start the voice application 122. In response, the chat application 120 may generate and send command(s) to launch (step 314) the voice application 122. For example, the chat application 120 may generate a random pipe name (alternatively referred to as a "message transport" name or a "channel" name) and pass this pipe name (e.g., using the API 222) as a command line argument to the voice application 122 to launch an executable for the voice application 122. In some instances, the pipe name may be a 128-bit globally unique identifier (GUID). The unique pipe name can distinguish the associated pipe from other named pipes in a list of named objects in the chat platform. The voice application 122 may start (step 316) a communication process based on the launched executable for the voice application 122. Once the voice application has started, the chat application 120 may return (step 318) a notification to the client extension 204 indicating that the communication process has started. In some examples, the notification can include an identification of the chosen pipe name.

Upon receiving the pipe name, the client extension 204 may instruct the chat application 120 to establish a connection (step 320) to the named pipe (or "message transport") having the given pipe name. A controller of the voice application 122 (e.g., the voice application local controller 214) may create a named pipe server with the given pipe name and may give access rights to the pipe server only to the currently logged-in security identifier (e.g., associated with the current user, such as a WINDOWS user), thereby preventing other users on shared or remote computers from accessing the pipe server. The chat application 120 may then establish a connection (step 322) to the named pipe server in the controller of the voice application 122 (e.g., the voice application local controller 214), e.g., using a NodeJS Net module that provides an asynchronous network API for creating stream-based TCP/IPC servers and clients. For example, the pipe server in the controller of the voice application 122 may create one or more instances of the named pipe, which can allow the pipe client (e.g., the chat application 120 or the client extension 204) to connect to an instance of the named pipe. The voice application 122 may notify (step 324) the chat application 120 that the connection to the named pipe is established, which may result in the chat application 120 notifying (step 326) the client extension 204 of the established named pipe connection. The named pipe (or "message transport") can serve as a voice communication channel for the user currently logged into the chat application 120 to engage in instant, secure voice communications with other users.

After the named pipe connections are established, messages can be sent (step 328) between the client extension 204 and the controller of the voice application 122 (e.g., the voice application local controller 214). These messages may correspond to or include user interface interactions and status updates. In some instances, however, the chat application 120 and the voice application 122 do not need to know the content of the messages, and thus no additional functionality (and associated computing cost) may be needed for these applications to provide the instant voice functionality for a chat platform.

Thereafter, based on the process illustrated in FIG. 3, a user may select a button or other element in a user interface of the chat application 120 (e.g., provided by the front-end component 202) to initiate an instant, secure voice communication. Selecting the button may cause the client extension 204 to issue a command to the voice application handler 206. The voice application handler 206 may then route a command to the voice application local controller 214 of the voice application 122. The voice application local controller 214 may process the command and activate the functionality 212 of the voice application 122. At this point, a named pipe or communication channel is established and may be used by users to start and end calls, participate in calls, mute a user microphone, etc., as described below in FIG. 4.

GUIs and User Workflow

As described herein, the chat application 120 and the voice application 122 may be integrated via an instant voice extension application (e.g., including the client extension 204, the voice application handler 206, and the voice application local controller 214) to obtain an integrated application. The integrated application can allow a user of the chat application 120 to conduct an instant, secure voice communication with other members of chat group using controls in a GUI of the chat application 120. In some examples, the chat application 120 and the voice application 122 can communicate and exchange data over a network (e.g., the network 128) to embed voice functionality into the chat application 120. Alternatively or additionally, chat functionality of the chat application 120 and voice functionality of the voice application 122 can be incorporated into or provided by a single application (e.g., the application 230). In some instances, one or more users may log into a chat platform that includes the chat functionality and the voice functionality.

Figure 4:
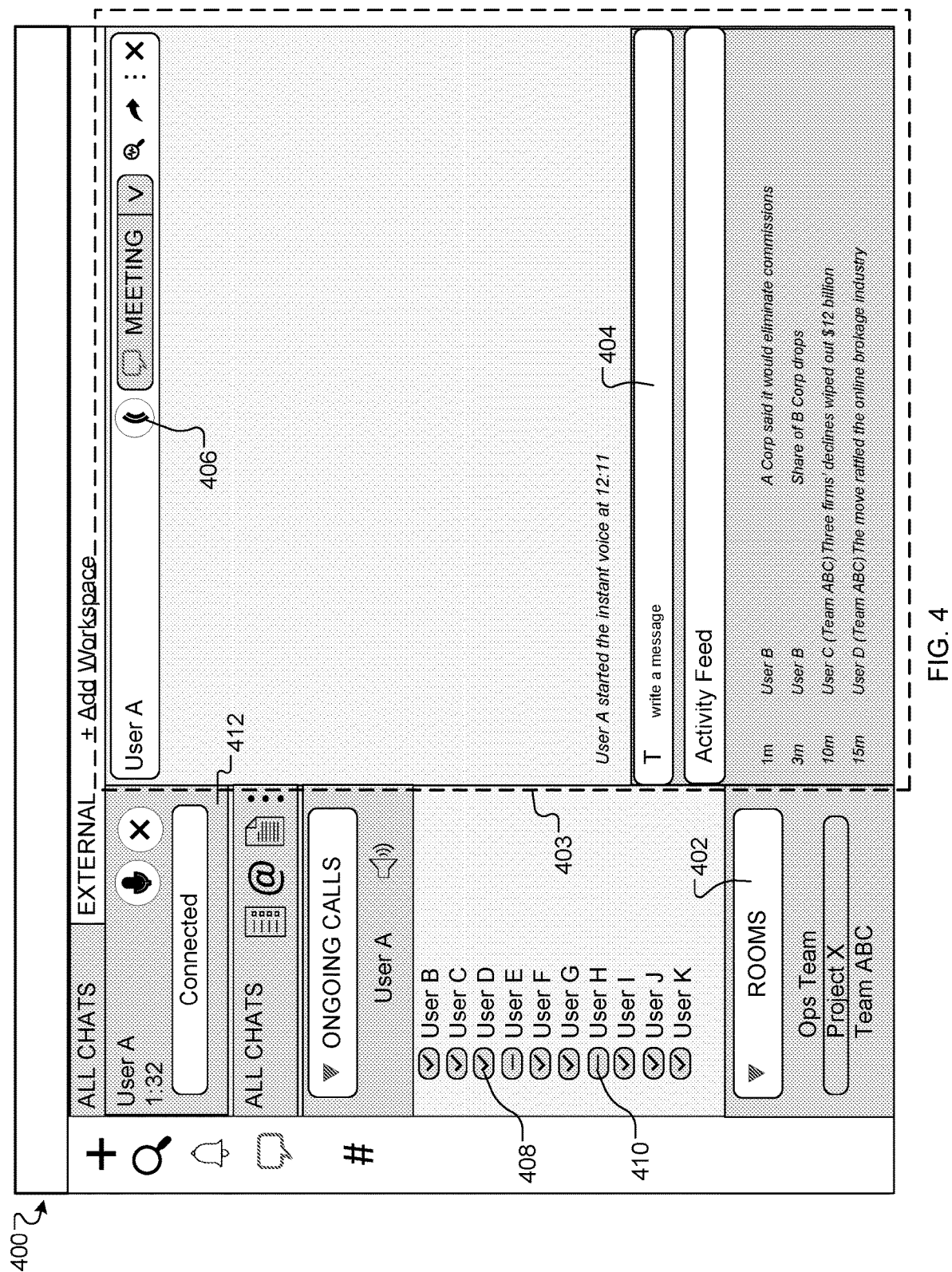
FIG. 4 is an example graphical user interface showing an in-progress instant voice communication, according to an exemplary embodiment.

FIG. 4 is an example GUI 400 presented to a user of the chat application 120 during an in-progress instant voice communication. As depicted, the GUI 400 includes a listing of chat rooms 402 that are available to the user, including "Ops Team," "Project X," and "Team ABC." Each of these chatrooms may include two or more members (e.g., including the user) and may have a chat window 403 where the user can enter and/or view text messages associated with the chatroom. Each chatroom can include an online text communication channel for chatroom members to exchange text messages in the chat window 403, for example, by entering messages in a text input field 404. When the user wants to engage in a voice communication with one or more other members of the chatroom, the user may select a button 406 or other element in the GUI 400. The button 406 may be available for each chatroom to which the user belongs and may appear at any location in the GUI 400 (e.g., in or near the chat window 403). Once the button 406 is selected, an instant, secure voice communication channel (e.g., using an API or a named pipe) can be created or accessed for the user and other chatroom members (e.g., all chatroom members or members who are currently logged in). The GUI 400 can include an indication 408 (e.g., a checkmark) of members who are available to participate in the voice communication and an indication 410 (e.g., a minus sign) of other members who are not available to participate in the voice communication. The voice connection can be implemented immediately upon the user's selection of the button 406. The voice connection can allow the user and other chatroom members can conduct back-and-forth verbal conversations in real time.

The initiating user may provide audio using a microphone device attached to or integrated into the client device associated with the user. In some instances, the initiating user can communicate by voice with any number of other chatroom members. In other examples, the number of users who can participate in the voice communication may be limited to a maximum value (e.g., 50 or 100). When a chatroom has more members than the maximum value, the button 406 may be unavailable (e.g., greyed out) in the GUI 400. In some instances, the maximum value may be adjustable.

In some examples, the GUI 400 may allow each user to customize how incoming voice communications are initiated or received. For example, a user may choose to receive incoming voice communications in a full-duplex and "auto answer" mode. When this mode is selected, the chat platform may cause the receiving user to automatically hear all audio or voice messages received from other users. Additionally or alternatively, the chat platform may automatically activate the receiving user's microphone such that the receiving user can transmit voice messages in return, without having to manually activate the microphone. In some instances, at the start of an instant voice connection, a receiving user may be provided with an audible or visual signal (e.g., a "splash tone") that informs the user that a new connection has started and/or that the user's microphone is active.

In the full-duplex notification mode, when an instant voice communication is received, the receiving user may be automatically connected to the communication channel, with the user's speaker and microphone activated for communication with other chatroom members. The GUI 400 may generate and display a connection box 412 to indicate that the instant voice communication is active. The connection box 412 may be positioned outside of the chat window 403 from which the instant voice call was originated. The connection box 412 may identify the receiving user's current status, such as "Connected." With full-duplex communications, the connection box 412 or other portions of the GUI 400 may include controls that allow a receiving user to: mute/unmute the user's microphone, release or exit the instant voice connection, add additional users to the instant voice connection and/or to the corresponding chatroom, turn on screen sharing, and the like. In general, the full-duplex communication mode can allow two or more user client devices to send and receive voice communications over one channel simultaneously.

A user may alternatively select to initiate or receive voice communications in a half-duplex or "Auto Speaker" mode. When this mode is selected, the chat platform may cause a receiving user to automatically hear all audio transmitted by a sending user. In contrast to full-duplex mode, however, half-duplex mode may not automatically activate the receiving user's microphone. For example, the receiving user may need to activate the microphone when the user wishes to send a voice message. Half-duplex may be a default communication mode for new chatrooms to which a user is added.

In general, the half-duplex communication mode can allow two or more user client devices to send and receive voice communications over one channel; however, the voice communications can be sent one at a time, such that when one client device is sending the other client device(s) is receiving. For example, communications over a channel can be unidirectional, such that messages can be sent in one direction at any given time. Alternatively or additionally, in some examples, the user client devices can send and receive unidirectional communications simultaneously, thereby effectively creating a full duplex communication. A single secured communication channel can be used for such simultaneous communications. Alternatively or additionally, the communication channel may provide one-to-one communication (e.g., two client devices exchanging communications), one-to-many communication (e.g., one client device sending communications to two or more client devices), or many-to-many communication (e.g., two or more client devices exchanging communications).

When a half-duplex instant voice communication is initiated, the chat platform may automatically connect the receiving user to the communication channel but may mute the receiving user's microphone, such that the receiving user can hear voice communications from other users but be unable to send voice communications. In such instances, the connection box 412 or other element of the GUI 400 may include controls that allow the receiving user to unmute the microphone and send voice communications. In general, mute/unmute functionality can be available once a call is established in any communication mode (e.g., full-duplex mode, half-duplex mode, or ringing mode). Additionally or alternatively, the controls may enable the receiving user to silence audio communications received from other users or to drop off or disconnect from the communication session. When a user disconnects, the user may be able to reconnect to (or restart) the communication session at a later time, for example, by identifying the corresponding chatroom for the communication session and selecting a connection button in the GUI 400.

In some implementations, a user may choose to receive incoming voice communications in a ringing mode. When this mode is selected, the chat platform may cause the receiving user to hear a ringing notification before any incoming voice communications are provided to the receiving user. Upon answering the instant voice communication (e.g., by clicking an "accept" button in the GUI 400), the receiving user may be able to hear the incoming voice communications and/or the receiving user's microphone may be activated. Alternatively or additionally, the receiving user may choose to not answer the call and/or may silence the ringer.

Additional Features

As described herein, the systems and methods disclosed herein can allow a user to initiate instant, secure voice communications for members of a text-based chatroom using a GUI for the chatroom. Other advantages of the systems and methods are described below.

End-to-End Encryption

In some instances, the instant, secure voice communications described herein may be end-to-end encrypted (E2EE) using datagram transport layer security and secure real-time transport protocol (DTLS-SRTP). DTLS-SRTP utilizes a combination of secure standards defined by the Internet Engineering Task Force (ITEF) through request for comment (RFC) 5764 and RFC 3711. Such techniques can secure audio transmission by allowing any two instant voice software installations to self-negotiate a secure exchange of cryptographic keys (DTLS), and the DTLS may then be used to encrypt audio media transmission (SRTP).

In various examples, encryption techniques can be used to provide serverless-voice transmission for a number of chatroom members (e.g., up to 50). In some instances, serverless communication may be available when users are connected within a local network. When a communication traverses more than one network, however, serverless communication may not be feasible and/or a Traversal Using Relay NAT (TURN) or a Session Traversal Utilities for NAT (STUN) server may be used. The instant voice communication can mandate a secure setup of an encryption channel between communication peers to negotiate encryption keys. The communication peers can include at least an initiating user and one or more receiving users. For example, when an instant voice communication channel is established, DTLS-SRTP may be applied such that encryption keys associated with the channel can be exchanged directly between the communication peers on the media plane.

In certain implementations, when a user initiates an instant voice communication, an API (e.g., a named pipe) can instruct a voice service (e.g., provided by the voice application 122) to start a call and the voice service can establish a secure voice communication channel with one or more other users who are available (e.g., online and logged in). The secure voice communication channel can be established via DTLS and carried out over SRTP using a TCP TURN for TLS connection. For example, when the voice communication is between users within the same local network, DTLS and SRTP over UDP (user datagram protocol) can be used, except when prohibited by policies of a user's organization, in which case TLS can be used. In general, when the voice communication is between users who are not in the same local network, TCP TURN for TLS channel can be used.

Audit Trail

In some examples, the systems and methods described herein can perform metadata generation and tracking for the instant, secure voice communications. Metadata generation may be an inherent feature of the voice application 122 (e.g., part of the functionality 212). For example, metadata related to a call state (e.g., a call is ringing or active) may be orchestrated or created by a central application specific signaling service. The signaling service may transmit changes in call state to the voice application 122. When the voice application 122 is integrated with the chat application 120 to trigger instant voice communications, as described herein, this data transmission may cause the front-end component 202 of the chat application 120 to display the call changes (e.g., incoming call, outbound call, etc.). Moreover, as the voice application 122 receives each signaling service instruction or call state identifier, the voice application 122 may generate relevant call change information. This call change information may be transmitted separately back to a cloud service of the voice application 120, where call change messages can be compiled into a single set of metadata. The metadata may describe the entirety of a call such as, for example, a call start time, a call end time, call participants, etc. The call metadata may be stored (e.g., in the cloud service) and/or made available to users of the chat application 120 (e.g., displayed in the GUI 400), the voice application 122, and/or the integrated application.

Recording

In various examples, the encryption techniques described herein may be embedded in the integrated application and/or may not be disabled by a user or an administrator. Calls between an initiating user and a receiving user may be transmitted directly between user client devices and can remain E2EE. As described above, E2EE voice communication can be achieved using DTLS-SRTP, where two instant voice software installations are allowed to self-negotiate a secure exchange of cryptographic keys, and the keys are then used to encrypt the voice communication. Neither the chat application 120 nor any third party may be able to listen to or intercept the encrypted calls.

E2EE calls provide a unique challenge to cloud platforms because it may not be possible to intercept the audio stream and record such calls. In contrast to other voice communication solutions, the present disclosure features local in-app recording at the point when the audio stream is decrypted (e.g., on one or more of the client devices). In some instances, the recording can be captured and stored in the user's local disk, which can then be uploaded for storage in any location, such as a local network or cloud storage (e.g., the cloud of the voice application 122). The recording feature may be activated or deactivated by a user using the GUI 400 of the chat application 120. The recording feature can be enabled or disabled by a user's administrator.

Flowchart

Figure 5:
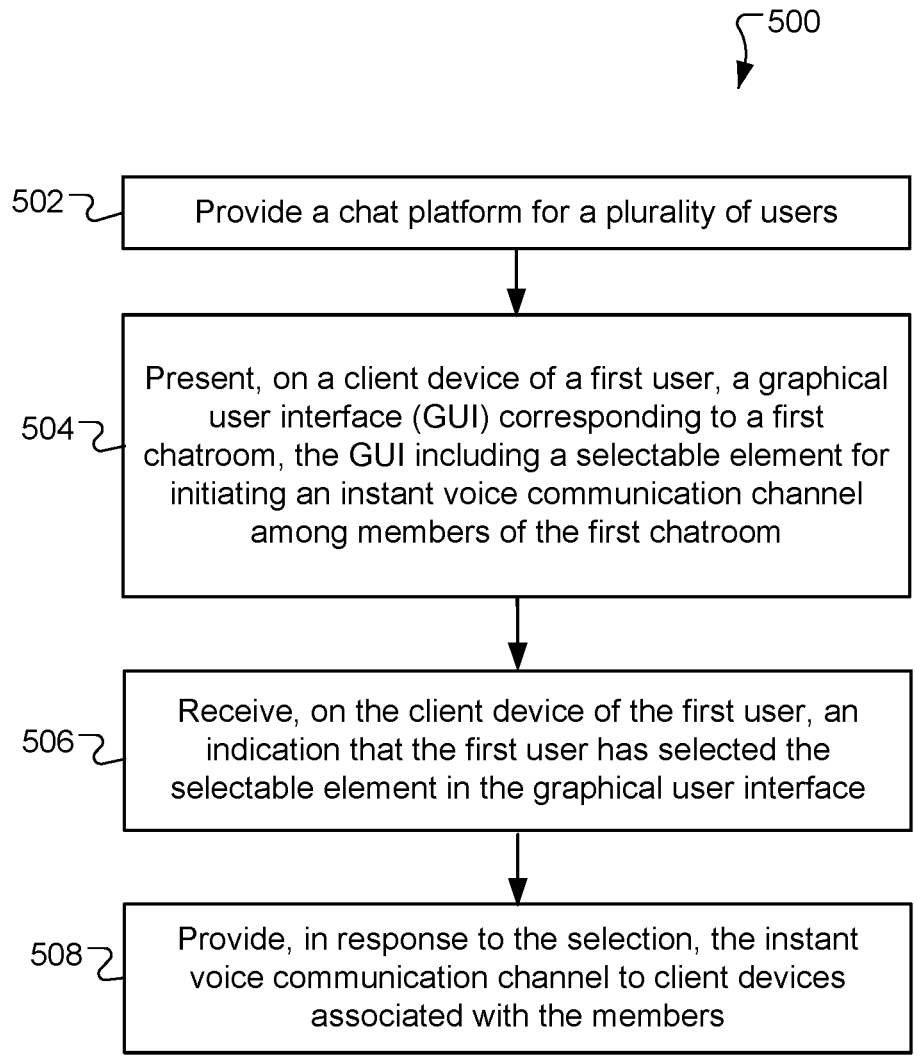
FIG. 5 is a flowchart of a method of providing instant voice communications for users using an embedded control in a chat application, according to an exemplary embodiment.

FIG. 5 is a flowchart of an example method 500 of providing instant voice communications for users of a text messaging application (e.g., a chat application), according to an exemplary embodiment. A chat platform is provided (step 502) for multiple users and includes multiple chatrooms. A graphical user interface corresponding to a first chatroom from the multiple chatrooms is presented (step 504) on a client device of a first user of the multiple users. The graphical user interface includes a selectable element for initiating an instant voice communication channel among members of the chatroom. The members include the first user and at least one other user from the multiple users. An indication that the first user has selected the selectable element in the graphical user interface is received (step 506) on the client device of the first user. In response to the selection, the instant voice communication channel is provided (step 508) to client devices associated with the members.

Computer-Based Implementations

In some examples, some or all of the processing described above can be carried out on a personal computing device, on one or more centralized computing devices, or via cloud-based processing by one or more servers. Some types of processing can occur on one device and other types of processing can occur on another device. Some or all of the data described above can be stored on a personal computing device, in data storage hosted on one or more centralized computing devices, and/or via cloud-based storage. Some data can be stored in one location and other data can be stored in another location. In some examples, quantum computing can be used and/or functional programming languages can be used. Electrical memory, such as flash-based memory, can be used.

Figure 6:
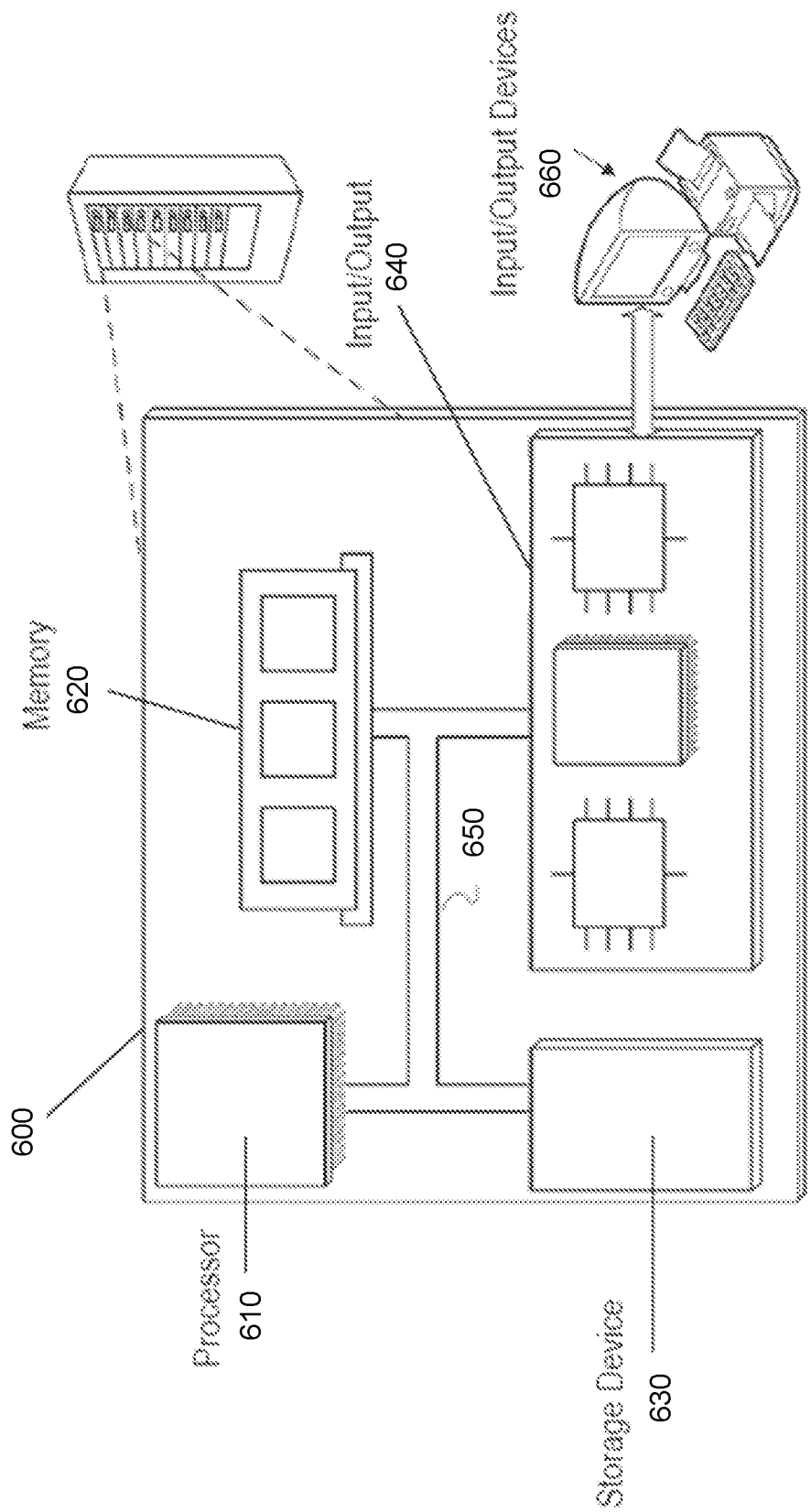
FIG. 6 is a block diagram of an example computer system, according to an exemplary embodiment.

FIG. 6 is a block diagram of an example computer system 600 that may be used in implementing the technology described herein. General-purpose computers, network appliances, mobile devices, or other electronic systems may also include at least portions of the system 600. The system 600 includes a processor 610, a memory 620, a storage device 630, and an input/output device 640. Each of the components 610, 620, 630, and 640 may be interconnected, for example, using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the system 600. In some implementations, the memory 620 is a non-transitory computer-readable medium. In some implementations, the memory 620 is a volatile memory unit. In some implementations, the memory 620 is a non-volatile memory unit.

The storage device 630 is capable of providing mass storage for the system 600. In some implementations, the storage device 630 is a non-transitory computer-readable medium. In various different implementations, the storage device 630 may include, for example, a hard disk device, an optical disk device, a solid-state drive, a flash drive, or some other large capacity storage device. For example, the storage device may store long-term data (e.g., database data, file system data, etc.). The input/output device 640 provides input/output operations for the system 600. In some implementations, the input/output device 640 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 630 may be implemented in a distributed way over a network, such as a server farm or a set of widely distributed servers, or may be implemented in a single computing device.

Although an example processing system has been described in FIG. 6, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
   providing a chat platform for a plurality of users, the chat platform comprising a plurality of chatrooms;
   presenting, on a client device of a first user from the plurality of users, a graphical user interface corresponding to a first chatroom from the plurality of chatrooms, the graphical user interface comprising a selectable element for initiating an instant voice communication channel among members of the first chatroom, the members comprising the first user and at least one other user from the plurality of users;
   receiving, on the client device of the first user, an indication that the first user has selected the selectable element in the graphical user interface; and providing, in response to the selection, the instant voice communication channel to client devices associated with the members,
wherein providing the instant voice communication channel comprises implementing a communication session among the members, and
wherein implementing the communication session comprises, without the at least one other user answering or accepting the communication session, (i) enabling the at least one other user to hear the first user's voice from a speaker associated with the at least one other user's client device and (ii) automatically activating a microphone associated with the at least one other user's client device.

2. The method of claim 1, wherein each chatroom from the plurality of chatrooms comprises an online text communication channel.

3. The method of claim 1, wherein the graphical user interface comprises a window corresponding to the first chatroom, and the selectable element comprises a button.

4. The method of claim 1, wherein the communication session is implemented within one second after the first user selected the selectable element.

5. The method of claim 1, wherein the instant voice communication channel provides at least one of half-duplex or full-duplex communication.

6. The method of claim 1, wherein the instant voice communication channel provides at least one of one-to-one communication or one-to-many communication.

7. The method of claim 1, wherein the instant voice communication channel provides end-to-end encryption of voice communications.

8. The method of claim 1, wherein the instant voice communication channel provides a no-ring communication.

9. The method of claim 1, wherein providing the instant voice communication channel comprises:
ringing a second client device associated with one of the members; and
enabling the one of the members to silence the ringing.

10. The method of claim 1, wherein providing the instant voice communication channel comprises recording communications occurring over the instant voice communication channel.

11. A system comprising:
one or more computer systems programmed to perform operations comprising:
providing a chat platform for a plurality of users, the chat platform comprising a plurality of chatrooms;
presenting, on a client device of a first user from the plurality of users, a graphical user interface corresponding to a first chatroom from the plurality of chatrooms, the graphical user interface comprising a selectable element for initiating an instant voice communication channel among members of the first chatroom, the members comprising the first user and at least one other user from the plurality of users;
receiving, on the client device of the first user, an indication that the first user has selected the selectable element in the graphical user interface; and
providing, in response to the selection, the instant voice communication channel to client devices associated with the members,
wherein providing the instant voice communication channel comprises implementing a communication session among the members, and
wherein implementing the communication session comprises, without the at least one other user answering or accepting the communication session, (i) enabling the at least one other user to hear the first user's voice from a speaker associated with the at least one other user's client device and (ii) automatically activating a microphone associated with the at least one other user's client device.

12. The system of claim 11, wherein each chatroom from the plurality of chatrooms comprises an online text communication channel.

13. The system of claim 11, wherein the graphical user interface comprises a window corresponding to the first chatroom, and the selectable element comprises a button.

14. The system of claim 11, wherein the instant voice communication channel provides at least one of half-duplex or full-duplex communication.

15. The system of claim 11, wherein the instant voice communication channel provides at least one of one-to-one communication or one-to-many communication.

16. The system of claim 11, wherein the instant voice communication channel provides end-to-end encryption of voice communications.

17. The system of claim 11, wherein the instant voice communication channel provides a no-ring communication, wherein the communication session is implemented within one second after the first user selected the selectable element.

18. The system of claim 11, wherein, to provide the instant voice communication channel, the one or more computer systems are programmed to further perform operations comprising:
ringing a second client device associated with one of the members; and
enabling the one of the members to silence the ringing.

19. The system of claim 11, wherein, to provide the instant voice communication channel, the one or more computer systems are programmed to further perform an operation comprising recording communications occurring over the instant voice communication channel.

20. A non-transitory computer-readable medium having instructions stored thereon that, when executed by one or more computer processors, cause the one or more computer processors to perform operations comprising:
providing a chat platform for a plurality of users, the chat platform comprising a plurality of chatrooms;
presenting, on a client device of a first user from the plurality of users, a graphical user interface corresponding to a first chatroom from the plurality of chatrooms, the graphical user interface comprising a selectable element for initiating an instant voice communication channel among members of the first chatroom, the members comprising the first user and at least one other user from the plurality of users;
receiving, on the client device of the first user, an indication that the first user has selected the selectable element in the graphical user interface; and
providing, in response to the selection, the instant voice communication channel to client devices associated with the members,
wherein providing the instant voice communication channel comprises implementing a communication session among the members, and
wherein implementing the communication session comprises, without the at least one other user answering or accepting the communication session, (i) enabling the at least one other user to hear the first user's voice from a speaker associated with the at least one other user's client device and (ii) automatically activating a microphone associated with the at least one other user's client device.

\* \* \* \* \*